United States Patent [19]

Smith et al.

[11] 3,826,056

[45] July 30, 1974

[54] MODULE CONSTRUCTION SYSTEM

[75] Inventors: Harold D. Smith, Lincoln; Richard E. Chambers, Canton, both of Mass.

[73] Assignee: The Unites States of America as represented by the Secretary of the Air Force, Washington, D.C.

[22] Filed: June 7, 1972

[21] Appl. No.: 260,567

[52] U.S. Cl. .............. 52/584, 52/753 J, 52/753 K, 52/620
[51] Int. Cl. .......................... E04c 1/10, E04b 2/10
[58] Field of Search ............ 52/584, 578, 615, 618, 52/238, 293, 309, 753 J, 753 R, 753 K; 287/20.92 J, 20.92 R, 20.92 K; 117/DIG. 7, 126 GE; 404/35; 403/335

[56] References Cited
UNITED STATES PATENTS

| | | | |
|---|---|---|---|
| 2,629,139 | 2/1953 | Thelander | 52/578 |
| 2,644,777 | 7/1953 | Havens | 52/618 |
| 2,647,287 | 8/1953 | Jones | 52/582 |
| 2,910,381 | 10/1959 | Vogel | 117/DIG. 7 |
| 3,280,522 | 10/1966 | Palfey et al. | 52/583 |
| 3,292,329 | 12/1966 | Garancsy | 52/293 |
| 3,353,314 | 11/1967 | Melcher | 52/583 |
| 3,379,104 | 4/1968 | Scholl | 404/35 |
| 3,605,851 | 9/1971 | Miles et al. | 161/135 |
| 3,616,185 | 10/1971 | Goldberg | 117/126 GE |
| 3,622,430 | 11/1971 | Jurisich | 52/618 |

FOREIGN PATENTS OR APPLICATIONS

| | | | |
|---|---|---|---|
| 238,806 | 8/1959 | Australia | 52/238 |
| 1,168,712 | 9/1959 | France | 287/20.92 K |

*Primary Examiner*—Frank L. Abbott
*Assistant Examiner*—James L. Ridgill, Jr.
*Attorney, Agent, or Firm*—Harry A. Herbert, Jr.; Arsen Tashijian

[57] ABSTRACT

A module construction system which can be used, and can be adapted to be used, to meet varying structural requirements for different construction applications, including use as an aircraft runway and as other surfaces for aircraft, including taxiways and ramps. The system includes: a plurality of identical load bearing structural modules, wherein each identical load bearing structural module is shaped in the form of a rectangular solid, and comprises an aluminum honeycomb core bonded to and between parallel flat skins of epoxy-fiberglass having a polyurethane coating, and molded fiberglass reinforced plastic edges having an outwardly facing semi-cylindrical surface configuration; means for releasably connecting in coplanar relationship, a plurality of the identical adjacent load bearing structural modules side edge-by-side edge and end edge-to-end edge; and means for releasably connecting, in layered relationship a plurality of the identical adjacent load bearing structural modules. Therefore, the system permits the use of a load bearing structural module singly or in an assembly of a plurality of the modules, and either in a single layer or stacked, to form a larger, or thicker, structural unit which is of the desired size, shape, strength, and stiffness.

3 Claims, 12 Drawing Figures

MODULE CONSTRUCTION SYSTEM

BACKGROUND OF THE INVENTION

This invention relates to the construction art and, more particularly, to a module construction system.

It is in the national interest that, particularly during a disaster or during military combat operations, friendly personnel moving into a destroyed or an unbuilt area be able to become operational as soon as possible.

As the prior art indicates, and as well known in the military establishment and in the civil defense field, the philosophy used to attain quick operational use has been to transport to the site mat-type interconnecting structural units, similar or identical to each other and designed for aircraft landing use, and to use these aircraft landing mats quickly to construct, i.e., to form, aircraft runways there. At the same site, and sometimes simultaneously with the construction of the aircraft runways, some of these similar or identical aircraft landing mats are used, and have been used, as a matter of necessity, improvisation, and custom, to build roadways for vehicles if the ground is soft, to form floors, walls and roofs in erecting needed temporary buildings, to support and protect revetments, and for other, and different, construction applications. The results of the use of aircraft landing mats, also referred to in the art as "planks" and "panels," for construction applications, other than as aircraft runways and the like, have been minimally acceptable at best and completely unsatisfactory at the worst. Even when used in the construction of aircraft runways, present state-of-the-art aircraft landing mats leave much to be desired.

It is a fair and accurate, therefore, to state that in the construction art, particularly the military and the civil defense aspects thereof, there is a genuine need for a module construction system, which includes a plurality of identical load bearing structural modules, and which system can be satisfactorily used, or can easily and rapidly be adapted to be used, to meet varying structural requirements for different construction applications, including use as an aircraft runway and as other surfaces for aircraft, including taxiways and parking ramps.

The prior art, analysis, and experience all establish that each of the identical load bearing structural modules to be used in the construction system, in addition to having the necessary load bearing capability, should be able to be used individually (i.e., singly); should be able to be releasably connected edge-to-edge, in coplaner relationship, and if desired, in layered (i.e., stacked) relationship with and to other identical load bearing structural modules; should be easily and conveniently transportable to and from the site; should be sufficiently light in weight and of such dimensions that it can be manually handled easily by personnel and can be rapidly placed by them in the desired location and in the desired position at the site; should be quickly and easily disconnectable from, and if necessary be individually removed and replaced with, other identical load bearing structural modules; should permit normal expansion and contraction due to temperature changes, even when releasably connected to other identical load bearing structural modules; should be resistant to petroleum, oils, and lubricants common to aircraft and vehicular operations; should be resistant to fire and flame spread; should provide integral waterproofing; should have high strength-to-weight ratio; should be able to be reused; should be easy to store when not in use; should be able to be manufactured by mass production methods; and should be relatively inexpensive and economical to manufacture.

We have invented a module construction system which includes a plurality of identical load bearing structural modules wherein each load bearing structural module meets these and other requirements; and, we have, thereby, significantly advanced the state-of-the-art.

SUMMARY OF THE INVENTION

This invention pertains to the module construction system which can be satisfactorily used, or can easily and rapidly be adapted to be used, to meet varying structural requirements, especially in the military and civil defense fields, for different construction applications, including use as an aircraft runway and as other surfaces for aircraft, including taxiways and parking ramps.

Therefore, an object of this invention is to provide a module construction system which includes a plurality of identical load bearing structural modules, wherein each identical load bearing structural module may be used individually (i.e., singly), or in an assembly of a plurality of releasably connected adjacent identical load bearing structural modules to form a larger and/or thicker structural unit of the desired size and shape, strength, and stiffness.

Another object of this invention is to provide a module construction system which includes means for releasably connecting, in coplaner relationship, a plurality of the identical load bearing structural modules, side edge-by-side edge and end edge-to-end edge, wherein said modules are adjacent.

Still another object of this invention is to provide a module construction system which includes means for releasably connecting, in layered (i.e., stacked) relationship, a plurality of the identical load bearing structural modules which are adjacent.

A further object of this invention is to provide a load bearing structural module which can be easily and conveniently transported, in quantity, by aircraft, truck, fork lift and the like.

A still further object of this invention is to provide a load bearing structural module that is sufficiently light in weight and is of such dimensions that it can be manually handled easily by personnel and can be rapidly placed by them in the desired location and in the desired position at the site.

Yet another object of this invention is to provide a load bearing structural module which can be quickly and easily disconnected from, and if necessary individually removed and replaced with, other identical load bearing structural modules.

Other equally important objects of this invention include, to provide a load bearing structural module: that will permit normal expansion and contraction due to temperature changes, even when releasably connected to other identical load bearing structural modules; that is resistant to petroleum, oils, and lubricants common to aircraft and vehicular operations; that is resistant to fire and flame spread; that provides integral waterproofing; that has a high strength-to-weight ratio; that can be reused; that is easy to store when not in use; that can be manufactured by mass production methods; and that is relatively inexpensive and economical to manufacture.

These objects, and other and related ones, of this invention will become readily apparent after a consideration of the description of the invention and reference to the drawings.

It is to be noted that in FIGS. 8 through 11, inclusive, each of the points of coplaner interconnection between coplaner adjacent identical modules, with said interconnections formed by our inventive edge-to-edge coplaner releasable connecting means, are designated schematically by an "X" in the interest of maintaining simplicity of the drawings.

DESCRIPTION OF THE PREFERRED EMBODIMENT

Our invention is a module construction system which can be used, and can be adapted to be used, to meet varying structural requirements for different construction applications. The construction system comprises, in essence: a plurality of identical load bearing structural modules; means for releasably connecting, in coplaner relationship, a plurality of the identical load bearing structural modules which are adjacent; and means for releasably connecting, in layered (i.e., stacked) relationship, a plurality of the identical load bearing structural modules which are adjacent. It is to be noted and remembered that each of our load bearing modules may be used, as needed, singly or in an assembly of a plurality of releasably connected adjacent identical load bearing structural modules. Therefore, the system permits the use of a plurality of the load bearing structural modules either in a single layer (i.e., coplaner) or stacked (i.e., in a multi-layer) to form a larger and/or thicker structural unit which is of the desired size and shape, strength, and stiffness.

Figure 1:
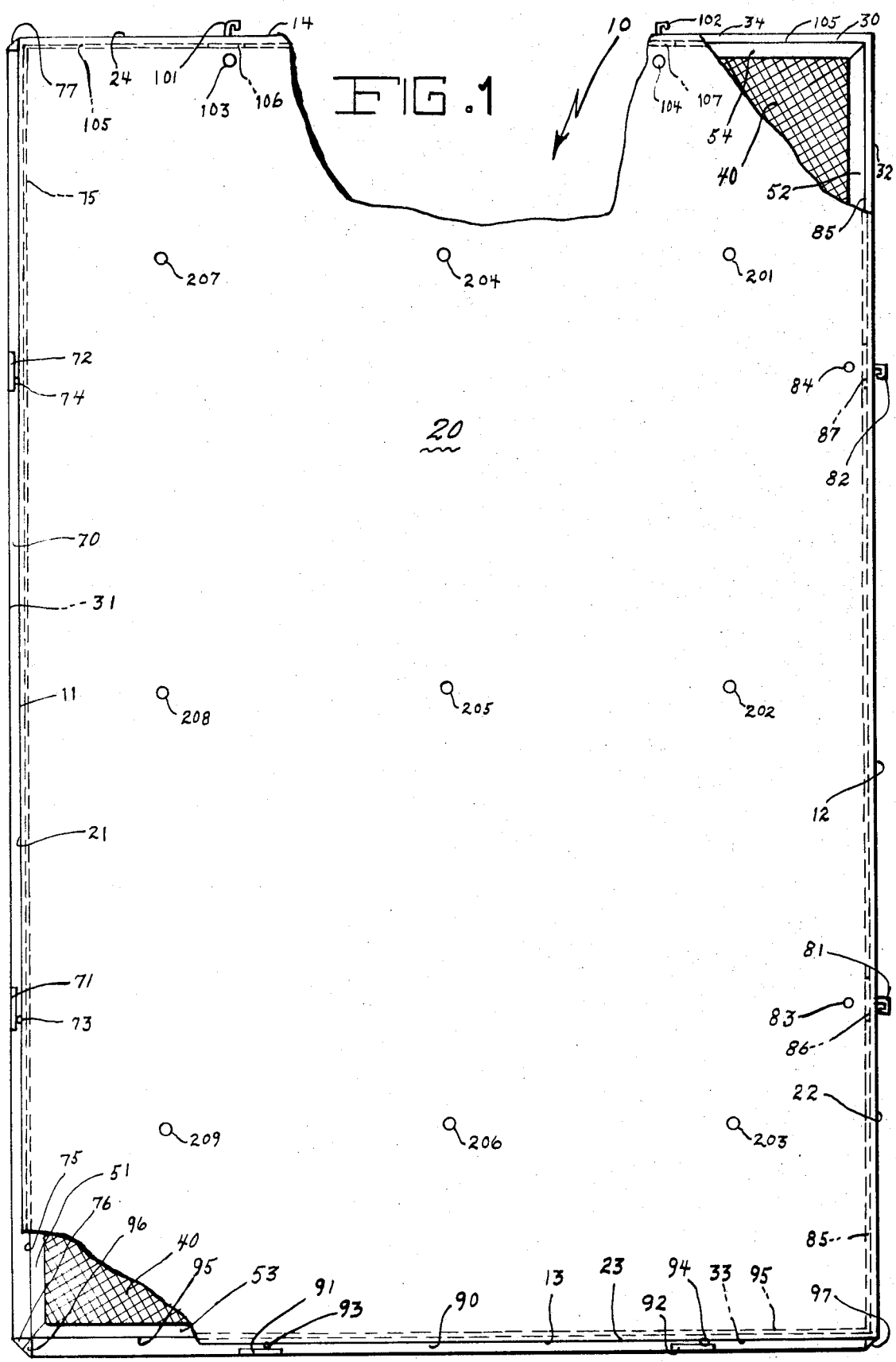
FIG. 1 is a top plan view, in simplified schematic form and partially fragmented, of a preferred embodiment of one of the plurality of identical load bearing structural modules which comprise, in part, our inventive module construction system.

With reference to FIG. 1, therein is shown, in simplified schematic form and partially fragmented, a top plan view of a preferred embodiment 10 of one of our plurality of identical load bearing structural modules which comprise, in part, our inventive module construction system. The structural module 10 shown in FIG. 1 is representative of each of the plurality of identical load bearing structural modules of our invention. Structural module 10 is substantially in the form of a rectangular solid, preferably having a length (hereinafter referred to as a "side edge") of 9 feet, a width (hereinafter referred to as an "end edge") of 6 feet, and a thickness of approximately 1.7 inches. Representative structural module 10 has first side edge 11, second side edge 12, first end edge 13, and second end edge 14. Representative structural module 10 includes, but is not limited to, a flat upper skin 20, a flat lower skin 30, an aluminum honeycomb core 40 interposed between skins 20 and 30, and four edge members 51, 52, 53 and 54.

Flat upper skin 20 is rectangular in form and has two side edges, first side edge 21 and second side edge 22, and two end edges, first end edge 23 and second end edge 24. Skin 20 is made preferably of epoxy-fiberglass and has an external coating of polyurethane.

Flat lower skin 30 is also rectangular in form and has two side edges, first side edge 31 and second side edge 32, and two end edges, first end edge 33 and second end edge 34. Lower skin 30 is of the same dimensions as upper skin 20 and is parallel spaced relationship to upper skin 20. Lower skin 30 is also made preferably of epoxy-fiberglass and has an external coating of polyurethane.

Aluminum honeycomb core 40 is a solid rectangle in form, but is smaller in rectangular dimensions than upper skin 20 and lower skin 30. The core 40 is centrally disposed between, abuts with, and is bonded to upper skin 20 and lower skin 30.

The four edge members 51, 52, 53 and 54 are made preferably of fiberglass reinforced plastic. Each edge member is disposed between upper skin 20 and lower skin 30, and abuts with and is bonded to upper skin 20, lower skin 30, and aluminum honey core 40. Edge members 51 and 52 are side edge members and edge members 53 and 54 are end edge members. Each of the edge members 51–54 has the same size (i.e., radius) crescent or simi-cylindrical outwardly facing surface configuration which is not shown in FIG. 1, but will be shown in other Figures.

Still with reference to FIG. 1, also shown therein are components which are included in our means for releasably connecting, in coplaner relationship, a plurality of adjacent load bearing structural modules identical to representative module 10. In this regard it is to be noted that this means is essentially a tongue-and-groove type arrangement.

This releasable coplaner connecting means includes a tongue type portion for side edge 11 of representative module 10, a groove type portion for side edge 12 of module 10, a tongue type portion for end edge 13 of module 10, and a groove type portion for end edge 14 of module 10.

Tongue type portion for side edge 11 of representative module 10 includes a first hollow aluminum right circular cylinder or tube 70 which mates with and is removably attached to side edge member 51 of module 10. Cylinder 70 has therein a plurality, preferably two, suitably positioned longitudinally aligned slots 71 and 72 in its outwardly facing surface. Engaging pin 73 is fixedly positioned in a vertical condition within hollow cylinder 70 opposite to slot 71. Engaging pin 74 is fixedly positioned in a vertical condition within hollow cylinder 70 opposite to slot 72. A rubber gasket 75 is disposed between, and for the entire length of, hollow cylinder 70 and side edge member 51. Rubber seals 76 and 77 are removably positioned, respectively, at each end of hollow cylinder 70.

Groove type portion for side edge 12 of representative module 10 includes a plurality, preferably two (which is the same number as the number of slots 71 and 72 in cylinder 70), of suitably positioned edge latches 81 and 82 positioned in side edge member 52 of module 10. The edge latches 81 and 82 are reversably movable (i.e., they may be moved outwardly or inwardly), by turning, respectively, turning pins 83 and 84. A rubber gasket 85 is suitably slotted with slots 86 and 87 to permit the passage therethrough of, respectively, edge latches 81 and 82. Rubber gasket is affixed by suitable means to the outwardly facing surface of side edge member 52.

The tongue type portion for end edge 13 of representative module 10 is similar to the tongue type portion of side edge 11. The tongue type portion includes a second hollow aluminum right circular cylinder or tube 90 of the same diameter as first hollow aluminum right circular cylinder 70 and similarly has an outwardly facing surface. Cylinder 90 mates with, and is removably attached to, end edge member 53 of module 10. Cylinder 90 has therein a plurality, preferably two, of suitably positioned longitudinally aligned slots 91 and 92 in its outwardly facing surface. Engaging pin 93 is fixedly positioned in a vertical condition within hollow cylinder 90 opposite to slot 91. Engaging pin 94 is fixedly positioned in a vertical condition within hollow cylinder 90 opposite to slot 92. A rubber gasket 95 is disposed between, and for the entire length of, hollow cylinder 90 and end edge member 53. Rubber seals 96 and 97 are removably positioned, respectively, at each end of hollow cylinder 90.

The groove type portion for end edge 14 of representative module 10 is similar to the groove type portion of side edge 12 of module 10. The groove type portion for end edge 14 includes a plurality preferably two (which is the same number as the number of slots 91 and 92 in cylinder 90), of suitably positioned edge latches 101 and 102 positioned in end edge member 54 of module 10. The edge latches 101 and 102 are reversably movable (i.e., they may be moved outwardly or inwardly), by turning respectively, turning pins 103 and 104. A rubber gasket 105 is suitably slotted with slots 106 and 107 to permit the passage therethrough of, respectively, latches 101 and 102. Rubber gasket 105 is affixed by suitable means to the outwardly facing surface of end edge member 54.

As can be easily seen, since each of the plurality of load bearing structural modules is identical to representative module 10 and to each other, each side edge tongue type portion of each module is complementary with (i.e., engageable with) each side edge groove type portion of each module; and, each end edge tongue type portion of each module is complementary with (i.e., engageable with) each end edge groove type portion of each module. Therefore, adjacent modules may be releasably connected, in coplaner relationship, side edge-by-side edge or end edge-by-end edge, by mating the tongue type portion of one module with the complementary groove type portion of an adjacent module.

Still with reference to FIG. 1, also shown therein is a component which is included in our means for releasably connecting, in layered (i.e., stacked) relationship, a plurality of load bearing structural modules identical to representative module 10. That component is an inter-module connecting passage, such as 201. Representative module 10 has a plurality, preferably nine 201–209, of such inter-module connecting passages which are identical and which, as a matter of preference and not of limitation, are regularly spaced. As will be shown later herein, each passage, such as 201, is a vertical hollow passage which extends continuously through each module, such as 10.

Figure 2:
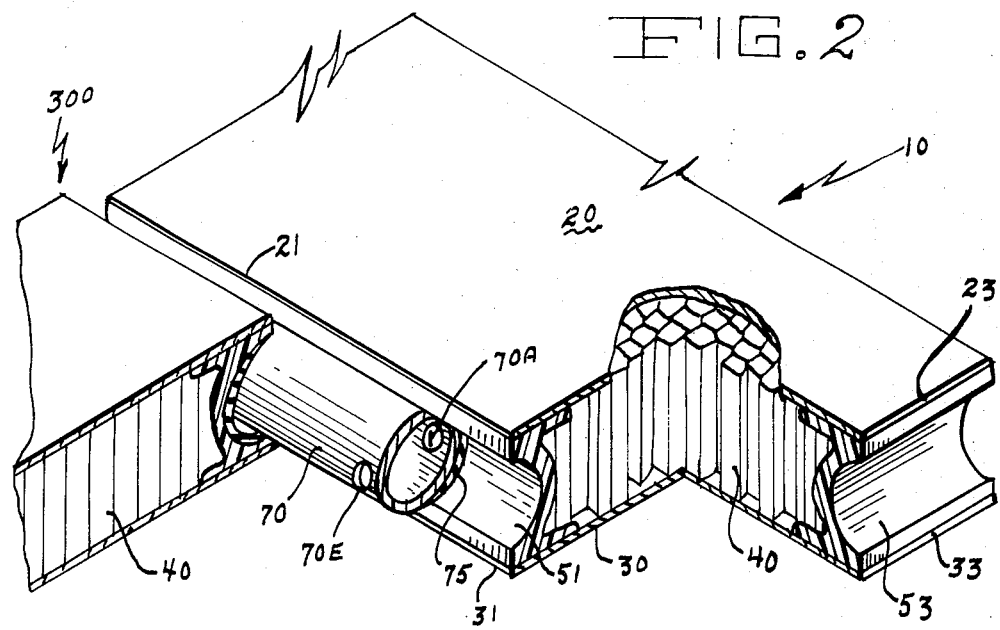
FIG. 2 is a top plan view, in perspective and in simplified schematic form, partially in cross-section and partially fragmented, of two adjacent identical load bearing structural modules of our invention, showing how one module is removably connected edge-to-edge to the other module in coplaner relationship.

With reference to FIG. 2, therein is shown a top plan view, in perspective and in simplified schematic form, partially in cross-section and partially fragmented, of two adjacent identical load bearing structural modules of our invention, depicting how one module is removably connected to the other module in side edge-to-side edge manner and in coplaner relationship. More specifically, shown is a portion of representative module 10 which includes flat upper skin 20 with first side edge 21 and first end edge 23, parallel spaced flat lower skin 30 with first side edge 31 and first end edge 33, centrally disposed aluminum honeycomb core 40, and side edge member 51 and end edge member 53 with their respective same sized (i.e., same radius) crescent or semi-cylindrical outwardly facing surface configuration.

Also shown in FIG. 2 are first hollow aluminum right circular cylinder or tube 70 and rubber gasket 75 of our releasable coplaner module connecting means. Cylinder 70 mates with and is removably attached to the outwardly facing semi-cylindrical surface of side edge member 51 of module 10 by quick connect fastener 70A which is removable through aligned hole 70E in cylinder 70. Cylinder 70 forms, in part, the side edge tongue type portion of the releasable coplaner module connecting means of module 10.

Further shown in FIG. 2 is a segment of module 300 which is identical to module 10 and is adjacent to it. The Figure portrays how the modules 10 and 300 are connected side edge-to-side edge by mating the side edge tongue type portion of module 10 with the complementary side edge groove type portion of adjacent identical module 300. It is to be noted that the end edge-to-end edge connection of coplaner adjacent identical modules, such as 10 and 300, is similar to the side edge-to-side edge connection shown in FIG. 2.

Figure 3:
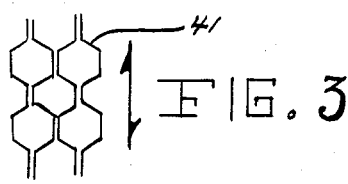
FIG. 3 is a top plan view, in schematic form, of a portion of the honeycomb core ribbon component of our invention, showing with a two-headed arrow the strong directions of the ribbon.

With reference to FIG. 3, therein is shown a top plan view, in schematic form, of a ribbon portion 41 of the aluminum honeycomb core component 40, FIGS. 1 and 2, of a module of our inventive system. The two-headed arrow shows the direction of the strong (i.e., more precisely, the stronger) dimension of the ribbon of core 40.

Figure 4:
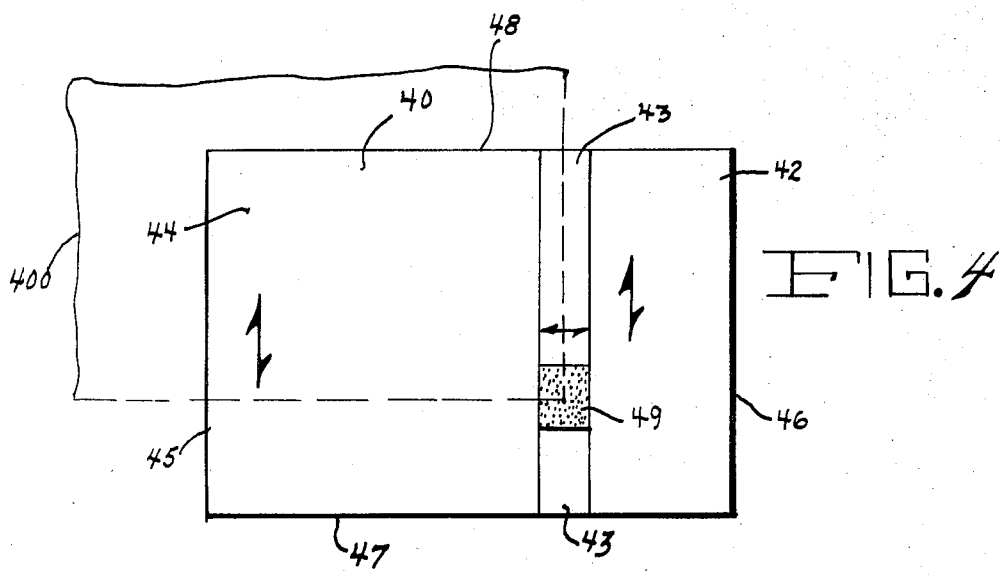
FIG. 4 is a top plan view, in schematic form, of the honeycomb core component of our invention, showing the different orientation of portions thereof.

With reference to FIG. 4, therein is shown a top plan view, in schematic form, of the aluminum honeycomb core component 40 of a module of our inventive system. The honeycomb core 40 is rectangular an has portions thereof, such as 42-44 which are differently oriented as to ribbon direction. The directions of the two-headed arrows in each portion 42-44 show the directions of the strong dimension of the ribbon of core 40. The orientation of the ribbon in portions 42 and 44 is the same and is in the direction which is parallel to core ends 45 and 46. The orientation of the ribbon in portion 43 is in the direction parallel to the side edges 47 and 48 of core 40, and therefore is parallel to the side edges 21 and 22 of upper skin 20, FIGS. 1 and 2, and to the side edges 31 and 32 of lower skin 30, FIGS. 1 and 2, of representative module 10. Within portion 43 of honeycomb core 40 is a high density section 49 of the aluminum honeycomb core 40. The purpose of the high density section 49 is to provide additional strength across a cross-joint, when the modules are used in a stacked and staggered fashion. In that regard, and for illustrative purposes, FIG. 4 also shows in phantom and fragmented the relative position of another module 400 stacked and staggered atop the module of which the aluminum honeycomb core 40 is a component.

Figure 5:
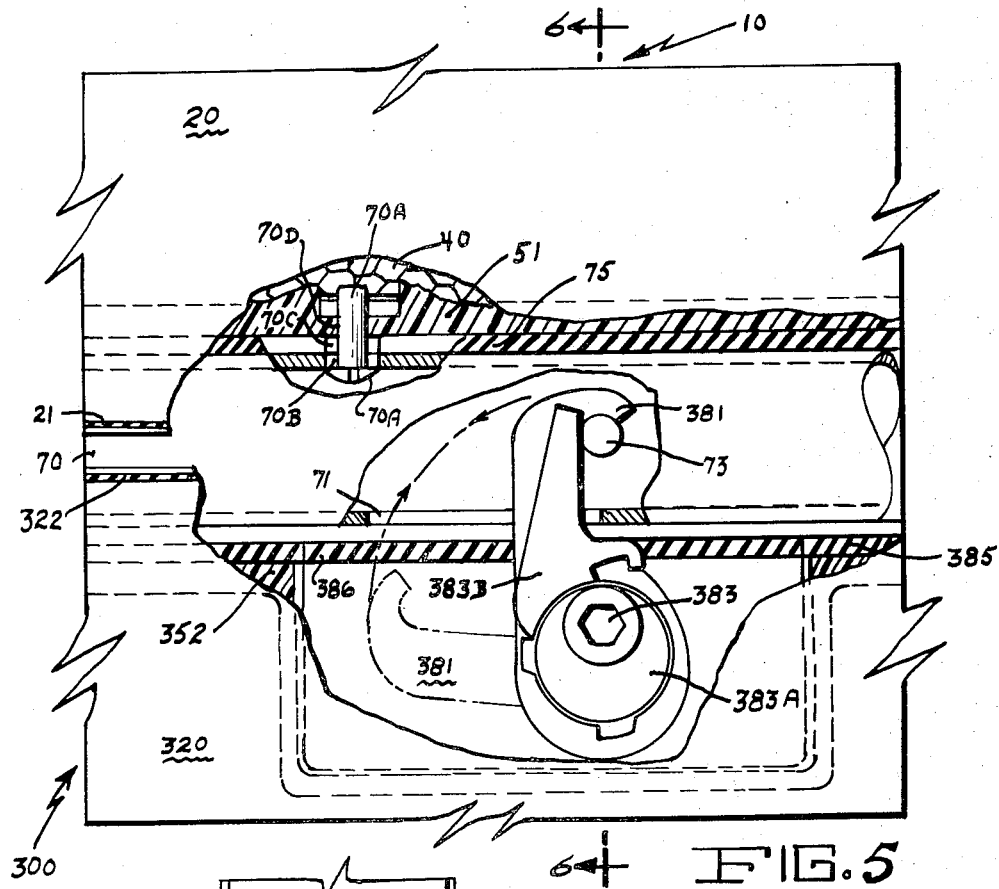
FIG. 5 is a top plan view, in simplified schematic form, partially in cross-section and partially fragmented, showing a preferred embodiment of our inventive means for releasably connecting, in coplaner relationship, two of our adjacent identical load bearing structural modules in an edge-to-edge manner.

With reference to FIG. 5, therein is shown a top plan view, in simplified schematic form, partially in cross-section and partially fragmented, of a preferred embodiment of our inventive means for releasably connecting, in coplaner relationship, a plurality of our adjacent identical load bearing structural modules in an edge-to-edge manner. In the interest of simplicity, and for illustrative purposes only, the releasable connection of only two, rather than more, of the adjacent identical load bearing structural modules is shown. Additionally, the releasable connection is equally applicable to, and used for, side edge-to-side edge connection and end edge-to-end edge connection. Therefore, for the sake of brevity, the releasable coplaner connecting means will be described as used only for side edge-to-side edge connection. Further, as previously stated, it is to be remembered that the releasable coplaner connecting means is essentially a tongue-and-groove type arrangement.

More specifically, shown in FIG. 5 is a portion of representative module 10 which includes flat upper skin 20 with first side edge 21, centrally disposed aluminum honeycomb core 40, side edge member 51, and a representative side edge tongue type portion of our inventive releasable coplaner connecting means. That tongue type portion includes first hollow aluminum right circular cylinder or tube 70 which mates with, and is removably attached to, side edge member 51. Cylinder 70 is removably attached to side edge member 51 by suitable means, such as quick connect fastener 70A the forward end of which is passed through hole 70B of cylinder 70, through hole 70C of rubber gasket 75, and through aperture 70D of side edge member 51 wherein it is turned and removably held in position. Cylinder 70 has a plurality of suitably positioned longitudinally aligned slots, such as 71, in its outwardly facing surface. A latch engaging pin, such as 73, is fixedly positioned in a vertical condition within cylinder 70 opposite to each slot. Rubber gasket 75 is disposed between cylinder 70 and side edge member 51.

Still with reference to FIG. 5, also shown therein is a segment of module 300 which is identical to module 10 and is adjacent to it. Module 300, as shown in FIG. 5, includes flat upper skin 320 with second side edge 322, and side edge member 352, and a representative side edge groove type portion of our inventive releasable coplaner connecting means, which said groove type portion is complementary (i.e., engageable with) to the above-described tongue portion. The groove portion includes a plurality of suitably positioned edge latches, such as 381, with one edge latch for each slot, such as 71, in cylinder 70. As shown in phantom, the representative edge latch 381 is reversably movable. Edge latch 381 may be moved outwardly to engage pin 73 or it may be moved inwardly to disengage it from pin 73. The movement, or turning, is accomplished by turning the pin 383 in the desired direction with a suitable tool, such as an Allen wrench or the like. The turning of pin 383 causes the turning of associated connected cooperative elements 383A and 383B which results in the turning, or movement, of edge latch 381. While being turned to engaged or disengage pin 73, the forward portion or hook of edge latch 381 passes through a slot (not shown) in side edge member 352 and a slot 386 in rubber gasket 385. When edge latch 381 is in the fully withdrawn or inward position, as shown in phantom, or is in the fully forward or outward position, as shown engaging the pin 73, the edge latch 381 remains stationary and secure, because of the configuration of, and the position then assumed by, cooperative elements 383A and 383B. The rubber gasket 385 is affixed by suitable means to the outwardly facing surface of side edge member 352 and forms a water seal.

Figure 6:
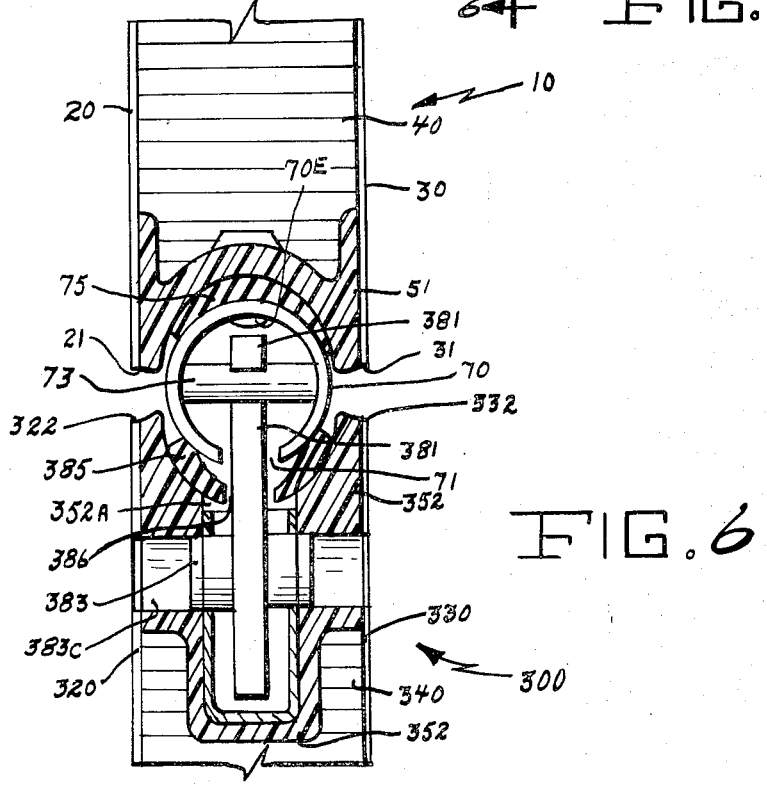
FIG. 6 is a side elevation view, in simplified schematic form and in cross-section, taken along line 6—6 of FIG. 5.

With reference to FIG. 6, shown therein is a side elevation view, in simplified schematic form and in cross-section, taken along line 6—6 of FIG. 5, of the preferred embodiment of our inventive means for releasably connecting, in coplaner relationship, a plurality of our adjacent identical load bearing structural modules in an edge-to-edge manner.

Shown are segments of identical modules 10 and 300 releasably connected in a side edge-to-side edge manner by our tongue-and-groove type connecting means.

As shown in FIG. 6, module 10 includes flat upper skin 20 with side edge 21, parallel spaced flat lower skin 30 with side edge 31, aluminum honeycomb core 40 interposed between skins 20 and 30, and side edge member 51 with its crescent or semi-cylindrical outwardly facing surface configuration. Identical module 300 includes flat upper skin 320 with side edge 322, parallel spaced flat lower skin 330 with side edge 332, aluminum honeycomb core 340, interposed between skins 320 and 330, and side edge member 352 with its crescent or semi-cylindrical outwardly facing surface configuration which is of the same size (i.e., radius) as the outwardly facing surface of side edge member 51, and which is recessed to accept and hold the edge latch mechanism of which edge latch 381 is a principal component.

As shown in FIG. 6, the tongue type portion of module 10 includes first cylinder or tube 70 which mates with and is removably attached to the outwardly facing semi-cylindrical surface of side edge member 51 by quick connect fastener 70A. Cylinder 70 has a slot 71 in its outwardly facing surface to permit the passage of edge latch 381 and has a latch engaging pin 73 fixedly positioned therein opposite to slot 71 to permit engagement of pin 73 with the hook (i.e., forward) portion of edge latch 381. Rubber gasket 75 is disposed between cylinder 70 and side edge member 51 to form a water seal.

The complementary groove type portion of identical adjacent module 300 includes edge latch 381 with associated connected cooperative elements (including turning pin 383 in aperture 383C), side edge member 352 with slot 352A therein to permit the passage of edge latch 381, and rubber gasket 385 which is affixed to the outwardly facing surface of side edge member 351 and which as a slot 386 therein to permit the passage of edge latch 381. Cylinder 70 of module 10 fits into and mates with the outwardly facing surface of side edge member 352 and with rubber gasket 385.

As related matter, it is to be noted that the edge latching mechanism (of which edge latch 381 and associated connected cooperative elements, such as turning pin 383, are components) is similar to and equivalent to "Dual-Lock" fasteners which are commercially available from the Simmons Fastener Corp., Albany, N.Y.

Figure 7:
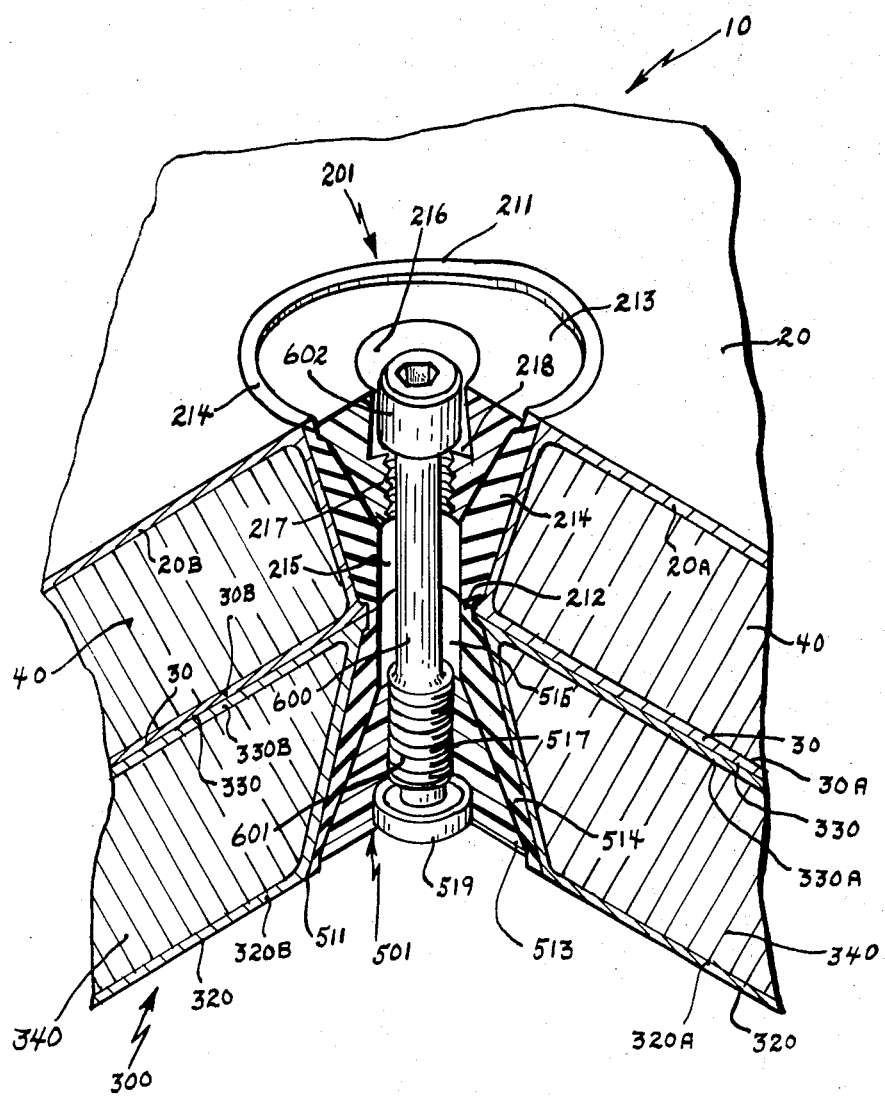
FIG. 7 is a side elevation view, in simplified schematic form, partially fragmented and partially in cross-section, showing a preferred embodiment of our inventive means for releasably connecting, in layered (i.e., stacked) relationship, two of our stacked adjacent identical load bearing structural modules.

With reference to FIG. 7, therein is shown in a side elevation view, in simplified schematic form, partially fragmented and partially in cross-section, a preferred embodiment of our inventive means for releasably connecting, in layered (i.e., stacked) relationship, two of our stacked adjacent identical load bearing structural modules. The means permits the releasable inter-panel connection of a plurality of our identical modules when stacked, and comprises essentially a novel bolting type arrangement.

Shown are segments of adjacent identical modules 10 and 30 releasably connected in layered (i.e., stacked) relationship by our novel inter-panel bolt type means. As shown in FIG. 7, module 10 includes flat upper skin 20 with edges 20A and 20B, parallel spaced flat lower skin 30 with edges 30A and 30B, aluminum honeycomb core 40 interposed between skins 20 and 30, and intermodule connecting passage 201. Module 10 in its entirety has a plurality, preferably nine, of such connecting passages which are identical and which, as a matter of preference, are regularly spaced. Module 300, which has been turned upside down (i.e., inverted), includes flat upper skin 320 with edges 320A and 320B, parallel spaced flat lower skin 330 with edges 330A and 330B, aluminum honeycomb core 340 interposed between skins 320 and 300, an inter-module connecting passage 501. Module 300, which is identical to module 10, also has the same number of inter-module connecting passages which are identical and which are similarly regularly spaced. Further, the position or location of the intermodule connecting passages on each of the identical modules of our system is such that the connecting passage of one module are in registration with the connecting passages of each of the other modules when one module is stacked, in registration, atop another module.

Each of the inter-module connecting passages, such as 201, of each of the identical load bearing structural modules, such as 10, of our inventive construction system is vertical and extends continuously through the module (i.e., through the flat upper skin, such as 20, through the aluminum honeycomb core, such as 40, and through the flat lower skin, such as 30). Each connecting passage, such as 201, has an end opening, such as 211, in the flat upper skin, such as 20, and an end opening, such as 212, in the flat lower skin, such as 30, of each module, such as 10. Each connecting passage, such as 201, is in the form of an inverted truncated cone and has therein a captive nylon nut, such as 213, which is in the shape of an inverted cone, and an inverted rubber cone, such as 214, which surrounds and holds the nylon nut, such as 213. The inverted rubber cone, such as 214, has an opening, such as 215, therethrough. The captive nylon nut, such as 213, has an opening, such as 216, therethrough with a portion, such as 217, suitably threaded to accept an upset threaded bolt, such as 600, and an annular shoulder, such as 218, to seat, to hold and to prevent the passage of bolt head 602. The opening, such as 216, of the captive nylon nut, such as 213, is closed by a removable waterproofing rubber seal (such as 519 in passage 501 of module 300). An upset threaded bolt, such as 600, is a bolt with threads, such as 601, upset (i.e., the thread diameter is greater than the shank diameter of the bolt).

In essence, therefore, our means for releasably connecting, in layered (i.e., stacked) relationship, a plurality of our adjacent identical load bearing structural modules includes a plurality of identical hollow vertical inter-layer connecting passages, such as 201, and a plurality of identical upset threaded bolts, such as 600, one of said bolts for each set of aligned passages, such as 201 and 501, to be used.

In releasably connecting two adjacent identical stacked modules, such as 10 and 300, by the use of aligned connecting passages, such as 201 and 501, the lower of the stacked modules, such as 300, must be in an inverted position, as previously mentioned. The waterproofing rubber seal is removed from opening 216 of captive nut 213 in passage 201 of module 10, and upset threaded bolt 600 is inserted, threaded portion 601 first, into and passed through the unthreaded portion of opening 216. Then the threaded portion 217 of captive nut 213 accepts the threaded portion 601 of upset bolt 600. Threaded portion 601 is then passed through threaded portion 217 of captive nut 213, through opening 215 of inverted rubber cone 214, through opening 515 of rubber cone 514, and into threaded portion 517 of captive nylon nut 513 which is in the aligned inter-layer connecting passage 501 of module 300. As driving of bolt 600 continues, bolt thread 601 engages captive nylon nut 513 and the modules 10 and 300 are drawn together, and held and are releasably connected. Captive nylon nut 213 thereafter acts as a washer. Bolt head 602 is seated on, and is prevented from passage, by annular shoulder 218 of captive nylon unit 213.

Although in FIG. 7 two adjacent modules are shown releasably connected in staked relationship, it is to be understood that more than two adjacent modules may be stacked and releasably connected with the use of our invention. The upset bolt 600 is, in that case, made of a length suitable to extend throughout the length (i.e., the thickness) of the stacked modules, and the upset bolt is inserted into and passed through the set of aligned vertical connecting passages, and is driven through the captive nylon nuts of each of the respective stacked modules until finally the threads of the upset bolt engage the threaded portion of the last of the captive nylon nuts and the modules are drawn together, are held, and are releasably connected.

As a related matter, each identical module of our inventive construction system weighs approximately 100 pounds and can be manually handled easily by two men.

MODE OF OPERATION OF OUR INVENTIVE MODULE CONSTRUCTION SYSTEM

As has been previously stated, our invention is a novel module construction system which can be used, or can be adapted to be used, to meet varying structural requirements for different construction applications, including use as an aircraft runway, taxiway, and parking ramp.

As has been shown, our inventive construction system includes: a plurality of identical load bearing structural modules; means for releasably connecting, in coplaner relationship, a plurality of the identical load bearing structural modules which are adjacent; and means for releasably connecting, in layered (i.e., stacked) relationship, a plurality of the identical load bearing structural modules which are adjacent.

In essence, the use of our construction system, of an adaptation thereof, is limited only by the imagination, the ingenuity, and the talents of using personnel who, incidentally, need not have any special skills. More specifically, our system permits the use of single modules in a horizontal, vertical, or sloped position, and either in an upright or in an inverted condition. Similarly, our system permits the use of a plurality of our releasably connected identical modules also in a horizontal, vertical, or sloped position, and either in an upright or in an inverted condition. When the modules are used as a plurality (i.e., in an assembly), the releasably connected adjacent modules may be used to form a larger structural unit in a single layer (i.e., in coplaner relationship). Also, when used as a plurality (i.e., in an assembly), the releasably connected adjacent modules may be used to form a thicker, stronger, and stiffer structural unit in layered (i.e., stacked) relationship.

Figure 9:
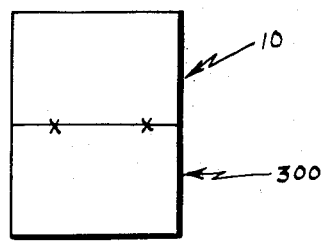
FIG. 9 is a top plan view, in simplified schematic form of two of our adjacent identical load bearing structural modules, showing how the two modules are releasably connected side edge-to-side edge.
Figure 8:
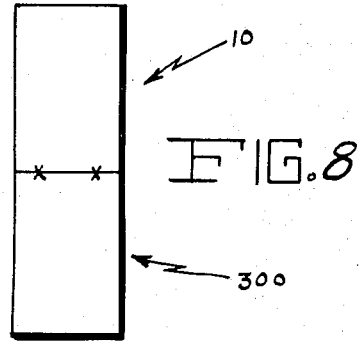
FIG. 8 is a top plan view, in simplified schematic form of two of our adjacent identical load bearing structural modules, showing how the two modules are releasably connected end edge-to-end edge.
Figure 10:
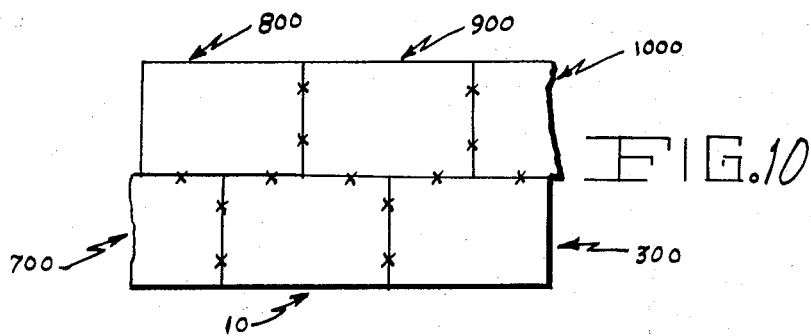
FIG. 10 is a top plan view, in simplified schematic form and partially fragmented, of a plurality of our identical load bearing structural modules which are adjacent to each other, showing how the plurality of modules are releasably connected to form, in coplaner relationship, an assembly of larger size with "brick-work" stagger of the end edges of the modules.
Figure 11:
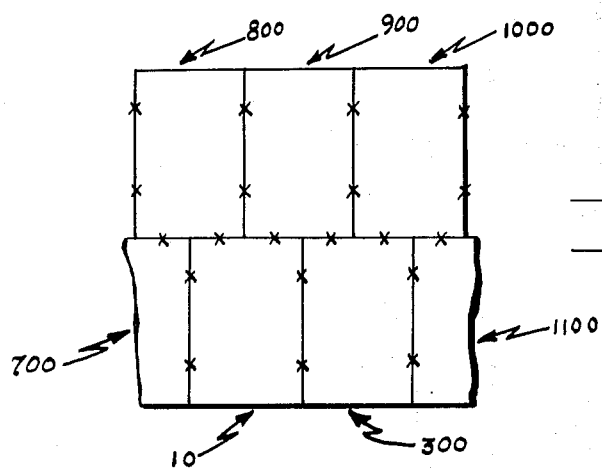
FIG. 11 is a top plan view, in simplified schematic form and partially fragmented, of a plurality of our identical load bearing structural modules which are adjacent to each other, showing how the plurality of modules are releasably connected to form, in coplaner relationship, an assembly of larger size with "brick-work" stagger of the side edges of the modules.
Figure 12:
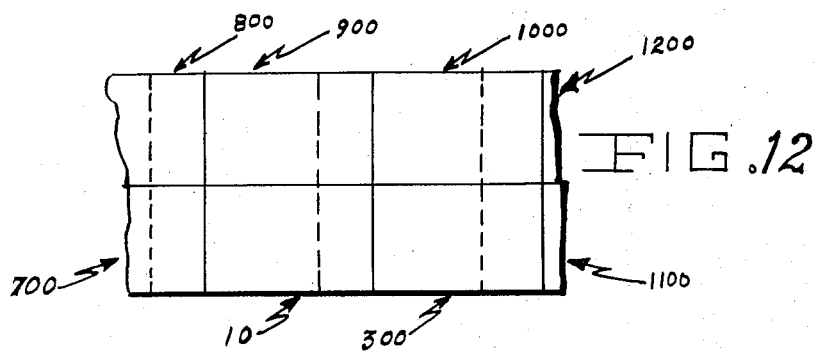
FIG. 12 is a top plan view, in simplified schematic form and partially fragmented, showing how a plurality or our inventive modules are releasably connectable to form, both in coplaner relationship and in layered relationship, a thicker assembly of larger size with "step-lap" in a two layer stack.

Additionally, and as shown in FIGS. 8–12, inclusive, a plurality of the adjacent modules may be releasably connected in various, and diverse, ways. The ways shown in said Figures are representative, are examples, and are for illustrative purposes and are not by way of any limitation. In FIGS. 8–11, inclusive, the interconnection point of each edge latch, such as 381, FIGS. 5 and 6, with its complementary engaging pin, such as 73, FIGS. 1,5 and 6,of our inventive tongue-and-groove type coplaner releasable connecting means is designated schematically by an "X" in the interest of maintaining simplicity of the drawings. In FIG. 8, two of our adjacent identical modules 10 and 300 are shown releasably connected in coplaner relationship end edge-to-end edge. In FIG. 9, two of our adjacent identical modules 10 and 300 are shown releasably connected in coplaner relationship side edge-to-side edge. In FIG. 10, a plurality of our adjacent identical modules (10, 300, 700, 800, 900 and 1,000) are shown releasably connected in coplaner relationship, end edge-to-end edge and side edge-to-side edge, to form an assembly of larger size with "brick-work" stagger of the end edges of the modules. In FIG. 11, a plurality of our adjacent identical modules (10, 300, 700, 800, 900, 1,000 and 1,100) are shown releasably connected in coplaner relationship, end edge-to-end edge and side edge-to-side edge, to form an assembly of larger size with "brick-work" stagger of the side edges of the modules. In FIG. 12 is shown a two-layer stack of assemblies formed by releasably connecting a plurality of our adjacent identical modules. The top or upper layer shows a plurality of our adjacent coplaner identical modules (10, 300, 700, 800, 900, 1,000, 1,100 and 1,200) releasably connected. The bottom or lower layer shows a plurality of our adjacent coplaner identical modules (not reference numbered) releasably connected. The end edges of the modules of the lower stack are shown in dotted lines in FIG. 12. It is to be noted that the modules in the upper layer and in the lower layer of the two-layer stack are "step-lapped" in one direction in relationship to each other. It is also to be noted that, of course, the modules in the upper layer and in the lower layer of the two-layer stack can be positioned so that they are in stacked registration in relationship to each other. That is, they may be positioned without "step-lap" (i.e., no laps). On the other hand, two adjacent stacked modules or assemblies thereof may be "step-lapped" in two directions, as inferentially shown in FIG. 4.

The manner of and means for releasably connecting, in coplaner relationship, a plurality of our adjacent identical load bearing structural modules, side edge-to-side edge and end edge-to-end edge, and the manner of and means for releasably connecting, in layered (i.e., stacked) relationship, a plurality of our adjacent identical load bearing structural modules, have already been shown and described, and their mode of operation has been explained, hereinabove. Therefore, it would not serve any useful purpose to reiterate in detail the modes of operation of these means at this time. In essence, the end-to-end and side-to-side releasable connection of coplaner adjacent modules is accomplished by a tongue-and-groove type arrangement, and the releasable connection of layered (i.e., stacked) adjacent modules is accomplished by a bolting type arrangement.

More specifically and in summary, adjacent identical load bearing structural modules are releasably connectable, in coplaner relationship, side edge-to-side edge, by mating the side edge tongue type portion of one adjacent identical load bearing structural module to the complementary side edge groove type portion of another adjacent identical load bearing structural module, and by thereafter engaging each vertically positioned engaging pin of the side edge tongue type portion with a latch of the complementary side edge groove type portion.

Adjacent identical load bearing structural modules are releasably connectable, in coplaner relationship, end edge-to-end edge, by mating the end edge type portion of one adjacent identical load bearing structural module to the complementary end edge groove type portion of another adjacent identical load bearing structural module, and by thereafter engaging each vertically positioned engaging pin of the end edge tongue type portion with a latch of the complementary end edge groove type portion.

Adjacent identical load bearing structural modules are releasably connectable, in layered (i.e., stacked) relationship, by: inverting (i.e., turning over) the lowest of the modules in the stack; aligning the desired vertical connecting passages to be used of each of the modules in the stack; inserting into each set of aligned connecting passages an upset threaded bolt, with the threaded portion inserted first; passing each upset bolt through its respective set of aligned connecting passages; and, removably engaging the threaded portion of each upset bolt with the threaded portion of the captive nut within the connecting passage in the lowest of the modules in the stack. The modules in the stack are, thereby, drawn together, are held, and are releasably connected.

Since the modules are releasably connected, whether in coplaner relationshp or in layered(i.e., stacked) relationship or both in coplaner and stacked layers ("step-layered" or not), they are obviously disconnectable. The procedure in disconnecting the releasably connected modules is merely to reverse the procedure used in connecting them. In addition, the removably attached hollow aluminum right circular cylinder or tube components, such as 70 and 90, FIG. 1, of each identical modules, such as 10, FIG. 1 may be easily and quickly removed and, if necessary, may be replaced with equal ease and rapidity.

It is clearly evident from the above description of our invention, and from the drawings herein, that all of the objects of our invention are attained. Therefore, it is not believed necessary to again set forth the objects, and other related thereto, and show how each and every object and others specifically are achieved by our invention. However, it is believed appropriate to state that, when our inventive construction system is used to form an airfield surface (such as an aircraft runway, taxiway, or parking ramp), it is our preference that two layers of coplaner assemblies of our modules be stacked to provide stiffness, and that the layers be staggered to provide structural continuity over edge joints between panels. Additional stacked and staggered layers may be used to upgrade performance (i.e., greater strength and stiffness, if desired or if deemed necessary.

While there have been shown and described the fundamental features of our invention, as applied to a particular and preferred embodiment, it is to be understood that various substitutions and omissions may be made by those of ordinary skill in the art without departing from the spirit of the invention.

What is claimed is:

1. A module construction system which can be used, and can be adapted to be used, to meet varying structural requirements for different construction applications, including use as aircraft runways, taxiways, and ramps, comprising:
   a. a plurality of identical load bearing structural modules, wherein each said identical structural module is substantially in the form of a rectangular solid having two side edges and two end edges, and wherein each said identical structural module comprises:
      1. a flat upper skin, rectangular in form, of epoxy-fiberglass with an external coating of polyurethane, with said flat upper skin having two side edges and two end edges;
      2. a flat lower skin, rectangular in form, of the same dimensions as, and in parallel spaced relationship to, said flat upper skin, with said flat lower skin made of epoxy-fiberglass and with an external coating of polyurethane, and with said flat lower skin having two side edges and two end edges;
      3. an aluminum honeycomb core, in the form of a rectangular solid and smaller in rectangular dimensions than said flat upper and lower skins, and centrally disposed between, abutting with, and bonded to, said flat upper and lower skins, with said honeycomb core having a portion thereof oriented such that its strong dimension is positioned in the direction parallel to the side edges of said flat upper and lower skins, and with said oriented portion of said honeycomb core having a high density section of aluminum honeycomb core therein;
      4. and, four edge members, two side edge members and two end edge members, of molded fiberglass reinforced plastic, with each said edge member disposed between said flat upper and lower skins, and abutting with and bonded to said flat upper and lower skins and said honeycomb core, and with each said edge member having a semi-cylindrical outwardly facing surface configuration of the same size;
   b. means for releasably connecting, in coplaner relationship, a plurality of said identical load bearing structural modules, side edge-to-side edge and end edge-to-end edge, wherein, said modules are adjacent;
   c. means for releasably connecting, in layered relationship, a plurality of said identical load bearing structural modules which are adjacent;
   whereby each load bearing structural module may be used, as needed, singly, and in an assembly of a plurality of releasably connected identical load bearing structural modules to form a larger and thicker structural unit which is of the desired size and shape, strength and stiffness.

2. A module construction system, as set forth in claim 1, wherein said means for releasably connecting, in coplaner relationship, a plurality of said identical load bearing structural modules side edge-to-side edge and end edge-to-end edge, is substantially a tongue and groove type arrangement, and wherein said means includes, as to each of said identical load bearing structural modules:
   a. a side edge tongue type portion which includes a first hollow aluminum right circular cylinder, having an outwardly facing surface, mating with, and removably attached to, one of said semi-cylindrical outwardly facing side edge members of said load bearing structural module, with said first hollow cylinder having therein at least two longitudinally aligned slots in the outwardly facing surface of said first hollow cylinder, and an engaging pin fixedly positioned in a vertical condition within said first hollow cylinder opposite to each slot, and a rubber gasket disposed between said first hollow cylinder and said side edge member;

b. a side edge groove type portion which includes at least two longitudinally aligned latches, positioned in the other of said semi-cylindrical outwardly facing side edge members of said load bearing structural module, with each said latch being reversably movable outwardly, and a rubber gasket suitably slotted to permit the passage therethrough of said latches and affixed to the surface of said other semi-cylindrical outwardly facing side edge member;

c. an end edge tongue type portion which includes a second hollow aluminum right circular cylinder, of the same outside diameter as said first hollow aluminum right circular cylinder and similarly having an outwardly facing surface, mating with, and removably attached to, one of said semi-cylindrical outwardly facing end edge members of said load bearing structural module, with said second hollow cylinder having therein at least two longitudinally aligned slots in the outwardly facing surface of said second hollow cylinder, and an engaging pin fixedly positioned in a vertical condition within said second hollow cylinder opposite to each slot, and a rubber gasket disposed between said second hollow cylinder and said end edge member;

d. an end edge groove type portion which includes at least two longitudinally aligned latches, positioned in the other of said semi-cylindrical outwardly facing end edge members of said load bearing structural module, with each said latch being reversably movable outwardly, and a rubber gasket suitably slotted to permit the passage therethrough of said latches and affixed to the surface of said other semi-cylindrical outwardly facing end edge member;

thereby each said side edge tongue type portion of each of said identical load bearing structural modules is complementary with each said side edge groove type portion of each of said identical load bearing structural module; and thereby each said end edge tongue type portion of each of said identical load bearing structural modules is complementary with each said end edge groove type portion of each of said identical load bearing structural modules;

whereby adjacent identical load bearing structural modules are releasably connectable, in coplaner relationship, side edge-to-side edge, by mating the side edge tongue type portion of one adjacent identical load bearing structural module to the complementary side edge groove type portion of another adjacent identical load bearing structural module, and by engaging each vertically positioned engaging pin of the side edge tongue type portion with a latch of the complementary side edge groove type portion;

and, whereby adjacent identical load bearing structural modules are releasably connectable, in coplaner relationship, end edge-to-end edge, by mating the end edge tongue type portion of one adjacent identical load bearing structural module to the complementary end edge groove type portion of another adjacent identical load bearing structural module, and by engaging each vertically positioned engaging pin of the end edge tongue type portion with a latch of the complementary end edge groove type portion.

3. A module construction system, as set forth in claim 1, wherein said means for releasably connecting, in layered relationship a plurality of said adjacent identical load bearing structural modules, of which there is at least a first and a second of said identical load bearing structural modules, includes:

a. a plurality of identical vertical hollow passages extending continuously through said flat upper skin, through said aluminum honeycomb core, and through said flat lower skin of each of said identical load bearing structural modules, with said plurality of identical vertical hollow passages have corresponding hollow passages similarly positioned in each of said identical load bearing structural modules, and with each of said plurality of identical vertical hollow passages having an end opening in said flat upper skin and an end opening in said flat lower skin, and with each of said plurality of identical vertical hollow passages being in the form of an inverted truncated cone having therein a captive nylon nut which is in the shape of an inverted cone with a center opening therethrough, a portion of which is threaded to accept an upset threaded bolt, and with said captive nylon nut surrounded and held by an inverted rubber cone within said respective hollow passage and with said rubber cone having a center opening therethrough;

b. and, a plurality of identical upset threaded bolts, one said upset bolt for each of the said plurality of identical vertical passages to be used, with each said upset bolt removably inserted into its respective hollow passage in one, a first, of said plurality of identical load bearing structural modules, with each said upset bolt passing through said first load bearing structural module and fitting into a vertically aligned hollow passage of a second of said plurality of identical load bearing structural modules, with said second of said plurality of identical load bearing structural modules disposed in an inverted position and in layered relationship with the first said identical load bearing structural module, and with said upset bolt removably engaging the threaded portion of the captive nut within the vertically aligned hollow passage of said inverted second identical load bearing structural module;

whereby said plurality of identical load bearing structural modules are releasably connected in layered relationship to form a thicker, stronger and stiffer structural unit.

* * * * *